(12) United States Patent
Kleinberger

(10) Patent No.: US 9,424,341 B2
(45) Date of Patent: Aug. 23, 2016

(54) INFORMATION MANAGEMENT SYSTEMS AND METHODS

(71) Applicant: Ilan Kleinberger, Jerusalem (IL)

(72) Inventor: Ilan Kleinberger, Jerusalem (IL)

(73) Assignee: CA, Inc., New York, NY (US)

( * ) Notice: Subject to any disclaimer, the term of this patent is extended or adjusted under 35 U.S.C. 154(b) by 594 days.

(21) Appl. No.: 13/658,692

(22) Filed: Oct. 23, 2012

(65) Prior Publication Data

US 2014/0114645 A1    Apr. 24, 2014

(51) Int. Cl.
*G06F 17/30* (2006.01)

(52) U.S. Cl.
CPC ... *G06F 17/30634* (2013.01); *G06F 17/30648* (2013.01); *G06F 17/30672* (2013.01); *G06F 17/30864* (2013.01)

(58) Field of Classification Search
CPC .................. G06F 17/30648; G06F 17/30864; G06F 17/30634; G06F 17/30672
See application file for complete search history.

(56) References Cited

U.S. PATENT DOCUMENTS

| | | | |
|---|---|---|---|
| 4,837,689 A * | 6/1989 | Tanaka et al. ............... 704/8 |
| 5,301,314 A * | 4/1994 | Gifford et al. | |
| 5,446,883 A * | 8/1995 | Kirkbride et al. | |
| 6,223,165 B1 * | 4/2001 | Lauffer ...................... 705/7.13 |
| 6,393,428 B1 * | 5/2002 | Miller et al. | |
| 6,434,549 B1 * | 8/2002 | Linetsky et al. ............ 707/719 |
| 6,498,921 B1 * | 12/2002 | Ho et al. ...................... 434/362 |
| 6,526,404 B1 * | 2/2003 | Slater et al. ................. 707/728 |
| 7,774,198 B2 * | 8/2010 | Roulland et al. ............... 704/9 |
| 8,117,196 B2 * | 2/2012 | Jones et al. ................. 707/731 |
| 2002/0099533 A1 * | 7/2002 | Jaqua ............... G06F 17/30669 704/1 |
| 2002/0167539 A1 * | 11/2002 | Brown et al. ................ 345/705 |
| 2003/0002445 A1 * | 1/2003 | Fullana et al. ............... 370/241 |
| 2003/0009448 A1 * | 1/2003 | Covington et al. ............ 707/3 |
| 2004/0019657 A1 * | 1/2004 | Akiyama ..................... 709/217 |
| 2007/0011131 A1 * | 1/2007 | Delefevre ....................... 707/1 |
| 2007/0174244 A1 * | 7/2007 | Jones ............................... 707/3 |
| 2008/0046516 A1 * | 2/2008 | Hyoung et al. .............. 709/205 |
| 2014/0114645 A1 * | 4/2014 | Kleinberger ................... 704/9 |

* cited by examiner

*Primary Examiner* — Samuel G Neway
(74) *Attorney, Agent, or Firm* — Baker Botts L.L.P.

(57) ABSTRACT

Management of information includes analyzing an inquiry with a language processor, and generating a keyword associated with the inquiry based on the analysis. Further, it may be determined whether an inquiry with the generated keyword previously has been received and stored in a memory and, when it is determined that such an inquiry previously has been received, the inquiry is retrieved from the memory. A recipient of the inquiry is assigned based on an inputted recipient or the keyword, and a recipient of an answer to the inquiry is designated. The inquiry is transmitted to the assigned recipient of the inquiry. An answer to the inquiry is received, the inquiry is marked as answered, and the answer is transmitted to the designated recipient of the answer. The inquiry, the keyword associated with the inquiry, and the answer to the inquiry are stored in the memory.

23 Claims, 2 Drawing Sheets

INFORMATION MANAGEMENT SYSTEMS AND METHODS

BACKGROUND

The present disclosure relates to systems and methods for managing information, and more specifically, to question-based documentation and management of information.

In existing information management systems, specific, valuable information supplied in response to a particular question, a particular request, or regarding a particular topic is often lost after it is provided. Even when the information management systems store this information, some of the information is periodically lost due to storage constraints, the information is difficult to access and is unorganized, or there is unnecessary, redundant information stored. In addition, when a particular inquiry arises, it is difficult to determine the best mode of resolving that inquiry using existing information management systems and methods.

BRIEF SUMMARY

According to one aspect of the disclosure, a method may comprise analyzing an inquiry with a language processor, and generating a keyword associated with the inquiry based on the analyzing. A recipient of the inquiry may be assigned based on an inputted recipient or the generated keyword. A recipient of an answer to the inquiry may be designated, and the inquiry may be transmitted to the assigned recipient of the inquiry. The answer to the inquiry may be received and the answer to the inquiry may be transmitted to the designated recipient of the answer. The inquiry, the keyword associated with the inquiry, and the answer to the inquiry may be stored in a memory.

According to another aspect of the disclosure, a system may comprise a receiver configured to receive an inquiry, a language processor configured to analyze the inquiry, and a keyword generator configured to generate a keyword associated with the inquiry based on analysis of the language processor. A memory in the system may be configured to store the inquiry, the keyword associated with the inquiry, and an answer to the inquiry. An assigning unit of the system may be configured to assign a recipient of the inquiry based on an inputted recipient or the generated keyword. A designating unit of the system may be configured to designate a recipient of an answer to the inquiry. A transmitter of the system may be configured to transmit the inquiry to the assigned recipient of the inquiry, and to transmit the answer to the inquiry to the designated recipient of the answer. The receiver of the system may be further configured to receive the answer to the inquiry.

According to a further aspect of the disclosure, a computer program product may comprise a computer readable storage medium having computer readable program code embodied therewith, and the computer readable program code may comprise computer readable program code configured to receive an inquiry, computer readable program code configured to analyze the inquiry using a language tool, and computer readable program code configured to generate a keyword associated with the inquiry based on analysis of the language processor. The computer readable program code may further comprise computer readable program code configured to store the inquiry, the keyword associated with the inquiry, and an answer to the inquiry in a memory. The computer readable program code may further comprise computer readable program code configured to assign a recipient of the inquiry based on an inputted recipient or the generated keyword, to designate a recipient of an answer to the inquiry, and to transmit the inquiry to the assigned recipient of the inquiry. The computer readable program code may further comprise computer readable program code configured to receive the answer to the inquiry and to transmit the answer to the inquiry to the designated recipient of the answer.

Objects, features, and advantages of aspects of the disclosure will be apparent to persons of ordinary skill in the art from the following description and the accompanying drawings.

BRIEF DESCRIPTION OF THE DRAWINGS

Aspects of the present disclosure are illustrated by way of example and are not limited by the accompanying figures with like references indicating like elements.

DETAILED DESCRIPTION

Figure 1:
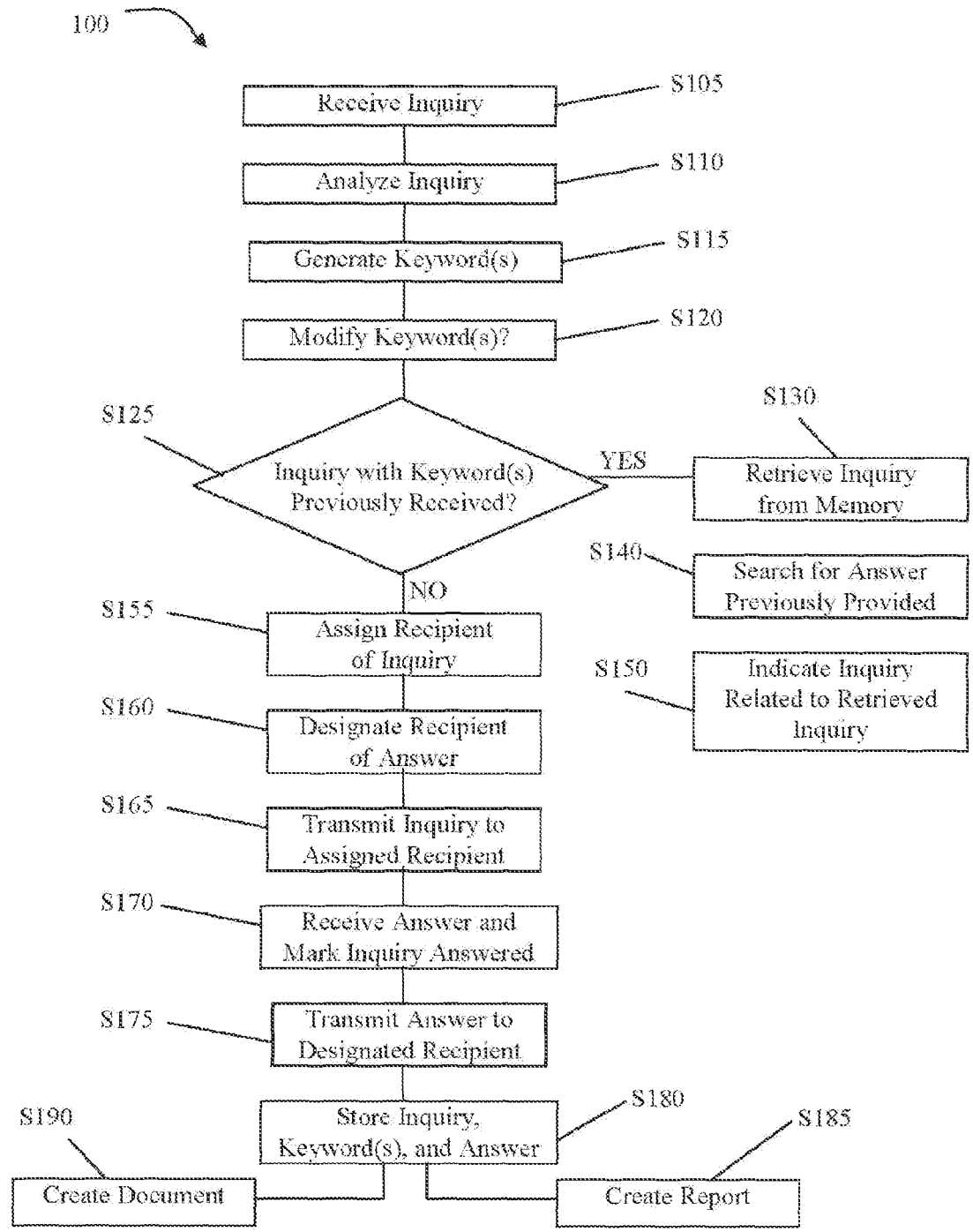
FIG. 1 illustrates a flowchart depicting a process, according to an embodiment.

As will be appreciated by one skilled in the art, aspects of the present disclosure may be illustrated and described herein in any of a number of patentable classes or context including any new and useful process, machine, manufacture, or composition of matter, or any new and useful improvement thereof. Accordingly, aspects of the present disclosure may be implemented entirely hardware, entirely software (including firmware, resident software, microcode, etc.) or combining software and hardware implementation that may all generally be referred to herein as a "circuit," "module," "component," or "system." Furthermore, aspects of the present disclosure may take the form of a computer program product embodied in one or more computer readable media having computer readable program code embodied thereon.

Any combination of one or more computer readable media may be utilized. The computer readable media may be a computer readable signal medium or a computer readable storage medium. A computer readable storage medium may be, for example, but not limited to, an electronic, magnetic, optical, electromagnetic, or semiconductor system, apparatus, or device, or any suitable combination of the foregoing. More specific examples (a non-exhaustive list) of the computer readable storage medium would include the following: a portable computer diskette, a hard disk, a random access memory (RAM), a read-only memory (ROM), an erasable programmable read-only memory (EPROM or Flash memory), an appropriate optical fiber with a repeater, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device. Program code embodied on a computer readable signal medium may be transmitted using any appropriate medium, including but not limited to wireless, wireline, optical fiber cable, RF, etc., or any suitable combination of the foregoing.

Computer program code for carrying out operations for aspects of the present disclosure may be written in any combination of one or more programming languages, including an object oriented programming language, such as JAVA®, SCALA®, SMALLTALK®, EIFFEL®, JADE®, EMERALD®, C++, C#, VB.NET, PYTHON® or the like, conventional procedural programming languages, such as the "C" programming language, VISUAL BASIC®, FORTRAN® 2003, Perl, COBOL 2002, PHP, ABAP®, dynamic programming languages such as PYTHON®, RUBY® and Groovy, or other programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider) or in a cloud computing environment or offered as a service such as a Software as a Service (SaaS).

Aspects of the present disclosure are described herein with reference to flowchart illustrations and/or block diagrams of methods, apparatuses (systems) and computer program products according to aspects of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable instruction execution apparatus, create a mechanism for implementing the functions/acts specified in the flowchart and/or block diagram block or blocks.

These computer program instructions may also be stored in a computer readable medium that when executed can direct a computer, other programmable data processing apparatus, or other devices to function in a particular manner, such that the instructions when stored in the computer readable medium produce an article of manufacture including instructions which when executed, cause a computer to implement the function/act specified in the flowchart and/or block diagram block or blocks. The computer program instructions may also be loaded onto a computer, other programmable instruction execution apparatus, or other devices to cause a series of operational steps to be performed on the computer, other programmable apparatuses or other devices to produce a computer implemented process such that the instructions which execute on the computer or other programmable apparatus provide processes for implementing the functions/acts specified in the flowchart and/or block diagram block or blocks.

According to an embodiment, a system may be implemented to facilitate more efficient communication between a user who may need help or have a question and another user who may be able to provide help or answer the question. Both the question and its answer may be received and stored in the system. The system may process the question using language processing tools and convert the question into a keyword or plurality of keywords that may represent the received question. The system may use the automatically generated keyword or plurality of keywords to verify that questions are not repeated. The question may be addressed to a particular user or group of users and the answer may be sent to any user who may be registered or who may register to receive it. A question may be marked as identical to an existing question in the system. A question may be split into a plurality of questions, each of which may be answered separately. The keyword or plurality of keywords associated with the question may be modified as needed. A plug-in to an email client may be implemented to facilitate use of the system, such that submitting and answering a question may be made similar to answering email. For example, an answer may be supplied as a reply to the question email sent by the system. The system may supply reporting, create documentation, and identify topics requiring training.

In an embodiment, the system may be implemented through the Internet or through an intranet, such that questions and answers received and stored in the system may be accessible by all users with access permission. A received question may have a keyword generated automatically by the system using language processing tools (e.g., Natural Language Processing, statistical word analysis, identifying relevant words in the question from a list of predefined keywords, or the like). The system may receive an input from a user submitting the question or from a user answering the question to change the generated keyword or plurality of keywords or to add a keyword, and the system may modify the generated keyword or plurality of keywords accordingly. The system may include a learning process to improve the language processing and the automatically generated keywords, based on the edited keywords. The system may search for relevant similar questions based on the generated keyword or plurality of keywords, to determine whether a similar question has been previously received and stored. Thus, the system may prevent similar questions from being answered twice.

The received question may be assigned to be transmitted to either a specific person or a group of people. The system may suggest or automatically assign to whom the received question is transmitted, for example, based on a generated keyword or predefined fields of expertise within a group of potential recipients or answerers. Accordingly, the question may be transmitted in a directed manner, which may ensure that the question is transmitted to the relevant person and that the question may either be answered or transmitted to another recipient who may answer the question.

Referring to FIG. 1, a process 100 for information management may be implemented, for example, in a system, a processing device, or a computer, e.g., a personal computer, a server, a mobile device, a processor, or the like. An inquiry may be received at S105. The received inquiry may be processed and analyzed at S110. The processing and analysis may be performed using language processing tools (e.g., Natural Language Processing, statistical word analysis, identifying relevant words in the question from a list of predefined keywords, or the like). At S115, a keyword or a plurality of keywords may be generated based on the processing and analysis. The generated keyword or plurality of keywords may be associated with the inquiry and may comprise a word that is included in the inquiry, a word related to the inquiry, a synonym of a word included in the inquiry, or the like. The generated keyword(s) may be displayed to a user for approval or modification. The generated keyword(s) may be modified at S120 to improve the accuracy of the keyword(s) associated with the inquiry.

At S125, a search may be performed, based on the generated keyword(s), to determine whether a similar inquiry to the received inquiry or an inquiry related to the received inquiry previously has been received and stored in a memory. When it is determined that a similar or related inquiry previously has been received (i.e., "Yes" in FIG. 1), the inquiry may be retrieved from the memory at S130. A plurality of inquiries may be determined to be similar or related and retrieved from the memory. The retrieved inquiry or plurality of inquiries may be displayed to a user and the user may select an inquiry to see if an answer previously has been provided for that inquiry. When it is determined that a similar or related inquiry previously has been received, a search may be performed for the answer to that inquiry at S140. If the search returns an answer to that inquiry that has been previously provided and stored in a memory, the previously provided answer may be displayed to a user. At S150, an indication may be made that the received inquiry is related to the retrieved inquiry, and the received inquiry and the retrieved inquiry may be associated with each other when stored in the memory.

When it is determined that a similar or related inquiry has not been received (i.e., "No" in FIG. 1) or that no answer to the retrieved inquiry is relevant to the received inquiry, a recipient of the inquiry may be assigned at S155. The recipient of the inquiry may be assigned in accordance with an inputted recipient that may be indicated by a user. The recipient of the inquiry may be assigned in accordance with the generated keyword(s). The recipient of the inquiry may be derived from a predetermined list of recipients, and may comprise a plurality of recipients. At S160, a recipient of an answer to the inquiry may be designated. The recipient of the answer to the inquiry may comprise a user who submitted the inquiry, an inputted recipient, an automatically generated recipient based on the keyword(s), or the like. The recipient of the answer to the inquiry may comprise a plurality of recipients. A received inquiry may be split into a plurality of inquiries, so that each inquiry may be answered and keyword(s) may be generated separately. When splitting an inquiry, assigned recipients of one of the plurality of inquiries and designated recipients of an answer to one of the plurality of inquiries may be assigned and designated for each of the plurality of split inquiries.

At S165, the inquiry may be transmitted to the assigned recipient of the inquiry. A file or additional data associated with the inquiry may be transmitted to the assigned recipient of the inquiry with the inquiry. The recipient of the inquiry may mark the inquiry as unclear and may request more information. This request for more information may be transmitted to the recipient of the answer to the inquiry. Thus, a dialogue may occur between the recipient of the inquiry and the recipient of the answer. The recipient of the inquiry may mark the inquiry as a duplicate of another inquiry. The recipient of the inquiry may assign the inquiry to another recipient, such that the inquiry is transmitted to the other recipient. The recipient of the inquiry also may designate another recipient of the answer. The recipient of the inquiry may split the inquiry into a plurality of inquiries and may answer each of the plurality of inquiries separately. The recipient of the inquiry may assign another recipient for all or one of the plurality of split inquiries.

The answer to the inquiry may be received and the inquiry may be marked as answered at S170. At S175, the answer to the inquiry may be transmitted to the designated recipient of the answer. The inquiry, the keyword(s) associated with the inquiry, and the answer to the inquiry may be stored in the memory at S180. The recipient of the inquiry and the recipient of the answer also may be stored in the memory in association with the inquiry, the keyword(s) associated with the inquiry, the answer to the inquiry, or combinations thereof. The memory may be searchable according to keywords, features, products, recipients of inquiries, recipients of answers, or combinations thereof.

At S185, a report may be created based on a product to which the inquiry is related, a feature or function of a product to which the inquiry is related, recipient(s) of the answer to the inquiry, recipient(s) of the inquiry, or combinations thereof. Thus, for example, a report may be created with information related to a particular product, feature, or version of product. Such a report may, for example, help define areas of documentation or training that need to be improved, and may help to identify a particular user or group of users that need specific training in particular products or features.

At S190, a document may be created in accordance with the keyword(s) associated with the inquiry, the recipient(s) of the inquiry, the recipient(s) of the answer to the inquiry, or combinations thereof. The document may comprise, for example, the inquiry and the answer to the inquiry. The document may be automatically created with inquiries and answers to the inquiries organized by subject or keyword in a predetermined format, table of contents, index, or the like, or combinations thereof.

Figure 2:
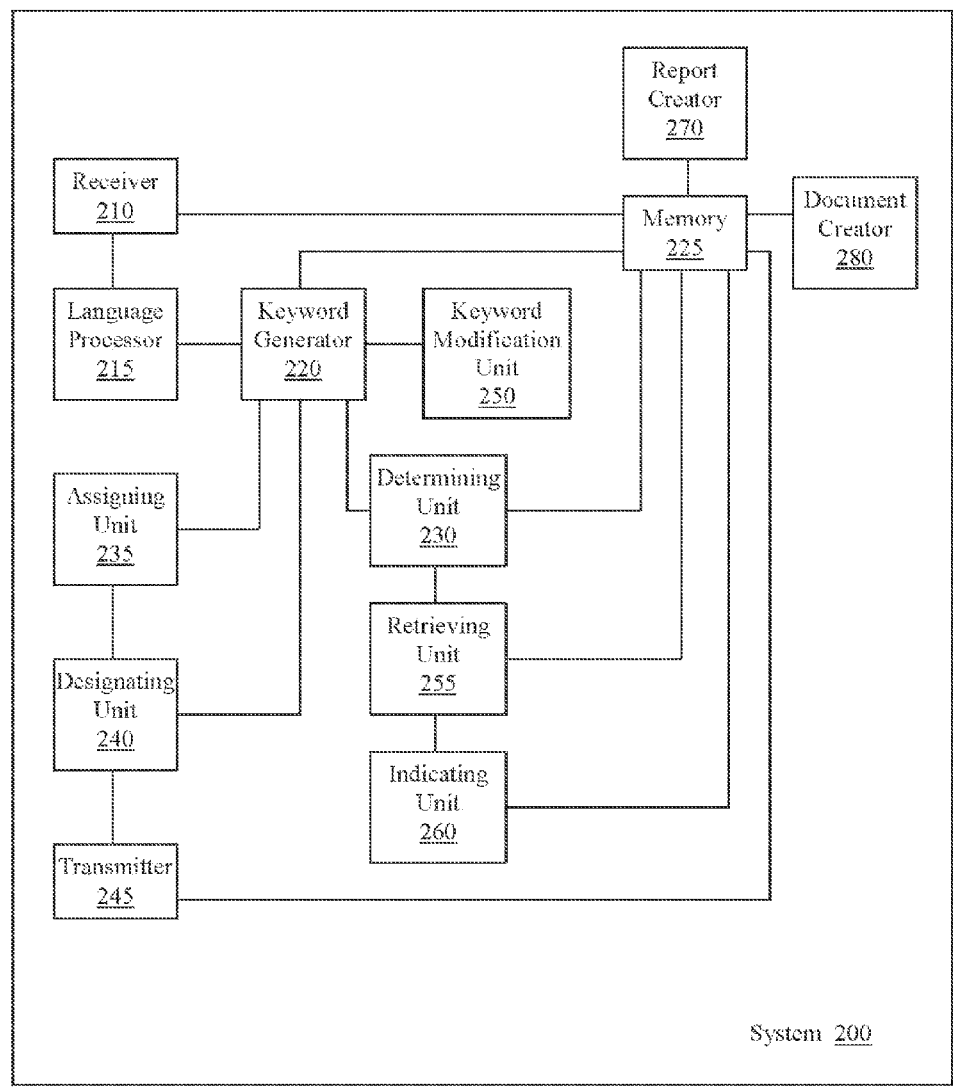
FIG. 2 illustrates a diagram depicting a system, according to an embodiment.

Referring to FIG. 2, a system 20 that may implement process 100 is depicted. System 20 may include a receiver 210 configured to receive an inquiry and to receive an answer to the inquiry. Receiver 210 also may be configured to mark an inquiry as answered when the answer to the inquiry is received. A processor or language processor 215 may be configured to process and analyze the inquiry received by receiver 210. A keyword generator 220 may be configured to generate a keyword associated with the inquiry based on the analysis of language processor 215. Keyword generator 220 may generate a plurality of keywords. Keyword generator 220 may be configured to divide the inquiry received by receiver 210 into a plurality of inquiries based on the generated plurality of keywords. A keyword modification unit 250 may be configured to modify the keyword(s) and to store the modified keyword(s) in association with the generated keyword in the memory to improve language processor 215. Thus, language processor 215 may "learn" and improve with use. A memory 225 may be configured to store the inquiry received by receiver 210, the keyword associated with the inquiry that is generated by keyword generator 220, and an answer to the inquiry received by receiver 210.

A determining unit 230 may be configured to determine whether an inquiry with the keyword generated by keyword generator 220 previously has been received and stored in memory 225. Further, a retrieving unit 255 may be configured to retrieve the inquiry from memory 225 when determining unit 230 determines that an inquiry with the generated keyword previously has been received. Retrieving unit 255 may be configured to search for and retrieve an answer that has been previously provided and stored in memory 225 based on the keyword if determining unit 230 determines that an inquiry with the generated keyword previously has been received. An indicating unit 260 may be configured to indicate that the inquiry is related to the inquiry retrieved from the memory by retrieving unit 255, when it is determined that an inquiry with the generated keyword previously has been received An assigning unit 235 may be configured to automatically assign a recipient of the inquiry based on an inputted recipient, a keyword generated by keyword generator 220, a predetermined list of recipients, or combinations thereof. Assigning unit 235 may create and display a list of suggested recipients of the inquiry from which a user may select a recipient of the inquiry. Assigning unit 235 may assign a plurality of recipients of the inquiry. A designating unit 240 may be configured to designate a recipient of an answer to the inquiry. Designating unit 240 may designate a plurality of recipients and a recipient may comprise a user who submitted the inquiry, an inputted recipient, an automatically generated recipient based on the keyword(s), or the like. Designating unit 240 also may designate another recipient of an answer inputted by the recipient of the inquiry. A transmitter 245 may be configured to transmit the inquiry to the assigned recipient of the inquiry, and to transmit the answer to the inquiry to the designated recipient of the answer. Transmitter 245 also may be configured to transmit a file or data associated with the inquiry to the recipient of the inquiry assigned by assigning unit 235. Further, transmitter 245 may be configured to transmit a request for clarification from the recipient of the inquiry to the recipient of the answer. When the inquiry received by receiver 210 is divided into a plurality of inquiries, transmitter 245 may transmit an inquiry of the plurality of inquiries to another recipient.

Memory 225 also may be configured to store the recipient of the inquiry and the recipient of the answer to the inquiry in association with the inquiry, the keyword(s) associated with the inquiry, the answer to the inquiry, or combinations thereof. A report creator 270 may be configured to create a report based on a product to which the inquiry is related, a feature or function of a product to which the inquiry is related, a recipient of the answer to the inquiry, or combinations thereof. A document creator 280 may be configured to create a document in accordance with the keyword associated with the inquiry, the recipient of the inquiry, the recipient of the answer to the inquiry, or combinations thereof. The document created by document creator 280 may comprise, for example, the inquiry and the answer to the inquiry. For example, the document may be automatically created with inquiries and answers to the inquiries organized by subject or keyword in a predetermined format, table of contents, index, or the like, or combinations thereof.

The present disclosure may prevent information from being hidden, lost, or deleted in various email boxes, folders, or the memory of individual workstations or computers. Systems and processes according to embodiments of the present disclosure may be implemented using an email system (i.e., integrated with an email system) or in conjunction with an email system. For example, a recipient of an inquiry may receive the inquiry in an email or may receive an email indicating that an inquiry has been received. Further, for example, a recipient of an answer to an inquiry may receive the answer in an email or may receive an email indicating that an answer has been received. Nevertheless, the information may be stored centrally, so that the information may be available to any user with access. Access may be restricted through the use of a password system, login identification, or the like. In addition, there may be levels of access, such that portions of the system are restricted to some users, while allowing other users to access those portions of the system. The use of keyword(s) may reduce duplicate questions and answers, and by suggesting recipients of the inquiry, directing the inquiry to the correct recipient may be more easily accomplished. In addition, a user may be more likely to find an answer to a particular inquiry without the need for a recipient of the inquiry to spend time answering every inquiry and to upload information.

Moreover, systems and processes according to embodiments of the present disclosure may more quickly and easily create a compendium of inquiries and answers, while reducing duplicate inquiries. Systems and processes according to embodiments of the present disclosure may increase productivity because most inquiries will have answers stored over time. Further, the loss of knowledge due to those with the knowledge no longer being available may be reduced or prevented. Systems and processes according to embodiments of the present disclosure also may provide useful informational documentation and may provide reports that may help define features that require additional documentation and training, and may identify users who may need targeted training, based on received inquiries, answers to the inquiries, keyword(s) associated with the inquiries, recipients of inquiries, recipients of answers to the inquiries, or combinations thereof. Such documentation and reports also may be useful for future users who face similar issues, use similar products, or use similar features.

The flowchart and block diagrams in the Figures illustrate the architecture, functionality, and operation of possible implementations of systems, methods, and computer program products according to various aspects of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular aspects only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of any means or step plus function elements in the claims below are intended to include any disclosed structure, material, or act for performing the function in combination with other claimed elements as specifically claimed. The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. The aspects of the disclosure herein were chosen and described in order to best explain the principles of the disclosure and the practical application, and to enable others of ordinary skill in the art to understand the disclosure with various modifications as are suited to the particular use contemplated.

What is claimed is:

1. A method, comprising:
   receiving:
   an inquiry from a user; and
   a plurality of answer recipients, the answer recipients having requested receipt of an answer to the inquiry, wherein the plurality of answer recipients are assigned at least one predefined field of expertise;
   analyzing, using a language processing system, the inquiry;
   generating at least one keyword associated with the inquiry based on the analyzing;
   receiving a modification to the at least one generated keyword from the user;
   in response to receiving the modification to the at least one generated keyword from the user, automatically improving the language processing system to learn from the modification to the at least one generated keyword from the user and improve accuracy for subsequent analyses;
   determining, using a processor, an inquiry recipient by:
   reading from a memory a plurality of potential inquiry recipients, each of the plurality of potential inquiry recipients being assigned at least one predefined field of expertise; and
   based on the at least one keyword, the at least one predefined field of expertise assigned to each of the plurality of potential inquiry recipients, and the at least one predefined field of expertise assigned to each of the plurality of answer recipients, suggesting that one of the potential inquiry recipients be the inquiry recipient;
   assigning the inquiry recipient to answer the inquiry;
   transmitting the inquiry to the inquiry recipient;
   receiving an answer to the inquiry;
   transmitting the answer to the inquiry to the plurality of answer recipients; and
   storing the inquiry, the at least one keyword associated with the inquiry, and the answer to the inquiry in the memory.

2. The method of claim 1, further comprising:
   searching for the at least one modified keyword in the memory;
   in response to not finding the at least one modified keyword in the memory, determining whether a related inquiry associated with the at least one keyword is stored in the memory; and
   retrieving the related inquiry from the memory.

3. The method of claim 1, further comprising indicating that the inquiry is answered in response to a receipt of the answer.

4. The method of claim 2, further comprising:
   searching for an answer stored in the memory utilizing the at least one keyword in response to a determination that the related inquiry associated with the at least one keyword is stored in the memory.

5. The method of claim 1, wherein transmitting the inquiry further comprises:
   transmitting a file associated with the inquiry to the inquiry recipient or transmitting a file associated with the answer to the inquiry to the plurality of answer recipients.

6. The method of claim 1, wherein generating the at least one keyword comprises:
   dividing the inquiry into a plurality of inquiries; and
   generating the at least one keyword based on the plurality of inquiries.

7. The method of claim 6, further comprising:
   transmitting a selected inquiry of the plurality of inquiries to another inquiry recipient.

8. The method of claim 1, further comprising:
   storing data indicating the inquiry recipient and the plurality of answer recipients in the memory in association with the inquiry and the at least one keyword associated with the inquiry.

9. The method of claim 1, further comprising:
   receiving a request for clarification of the inquiry; and
   transmitting the request for clarification of the inquiry to the plurality of answer recipients.

10. The method of claim 1, further comprising:
    creating a report based on a combination of: a product to which the inquiry is related, a feature or function of a product to which the inquiry is related, the inquiry recipient, and the plurality of answer recipients.

11. The method of claim 1, further comprising:
    creating a document based on: the at least one keyword associated with the inquiry, the inquiry recipient, the plurality of answer recipients, or a combination thereof, wherein the document comprises the inquiry and the answer to the inquiry.

12. A system, comprising:
    a first receiving unit configured to receive:
    an inquiry from a user; and
    a plurality of answer recipients, the answer recipients having requested receipt of an answer to the inquiry, wherein the plurality of answer recipients are assigned at least one predefined field of expertise;
    a language processing system configured to analyze the inquiry;
    a keyword generator configured to generate at least one keyword associated with the inquiry based on analysis of the language processing system;
    a second receiving unit configured to receive a modification to the at least one generated keyword from the user;
    an improving unit configured to, in response to the second receiving unit receiving the modification to the at least one generated keyword from the user, automatically improving the language processing system to learn from the modification to the at least one generated keyword from the user and improve accuracy for subsequent analyses;
    a processor configured to determine an inquiry recipient by:
    reading from a memory a plurality of potential inquiry recipients, each of the plurality of potential inquiry recipients being assigned at least one predefined field of expertise; and
    based on the at least one keyword, the at least one predefined field of expertise assigned to each of the plurality of potential inquiry recipients, and the at least one predefined field of expertise assigned to each of the plurality of answer recipients, suggesting that one of the potential inquiry recipients be the inquiry recipient, wherein the memory is further configured to store the inquiry, the keyword associated with the inquiry, and an answer to the inquiry;
an assigning unit configured to assign the inquiry recipient to answer the inquiry;
a transmitter configured to transmit the inquiry to the inquiry recipient; and
a third receiving unit configured to receive an answer to the inquiry,
wherein the transmitter is further configured to transmit the answer to the inquiry to the plurality of answer recipients.

13. The system of claim 12, further comprising:
a determining unit configured to determine whether a related inquiry associated with the at least one keyword is stored in the memory;
a retrieving unit configured to retrieve the related inquiry from the memory in response to the determining unit determining that the related inquiry associated with the at least one keyword is stored in the memory.

14. The system of claim 12, wherein the third receiving unit is further configured to indicate that the inquiry is answered in response to a receipt of the answer.

15. The system of claim 13, wherein the retrieving unit is further configured to search for and retrieve an answer that is stored in the memory utilizing the at least one keyword in response to the determining unit determining that the related inquiry associated with the at least one keyword is stored in the memory.

16. The system of claim 12, wherein the transmitter is further configured to transmit a file associated with the inquiry to the inquiry recipient or to transmit a file associated with the answer to the inquiry to the plurality of answer recipients.

17. The system of claim 12, wherein the keyword generator is configured to generate the at least one keyword by:
dividing the inquiry into a plurality of inquiries; and
generating the at least one keyword based on the plurality of inquiries.

18. The system of claim 17, wherein the transmitter is further configured to transmit a selected inquiry of the plurality of inquiries to another inquiry recipient.

19. The system of claim 12, wherein the memory is further configured to store the inquiry recipient and the plurality of answer recipients in association with the inquiry and the at least one keyword associated with the inquiry.

20. The system of claim 12, wherein the third receiving unit is further configured to receive a request for clarification of the inquiry, and
wherein the transmitter is further configured to transmit the request for clarification of the inquiry to the plurality of answer recipients.

21. The system of claim 12, further comprising:
a report creator configured to create a report based on a combination of: a product to which the inquiry is related, a feature or function of a product to which the inquiry is related, and the plurality of answer recipients.

22. The system of claim 12, further comprising:
a document creator configured to create a document based on: the at least one keyword associated with the inquiry, the inquiry recipient, the plurality of answer recipients, or a combination thereof,
wherein the document comprises the inquiry and the answer to the inquiry.

23. A computer program product comprising:
a computer readable storage medium having computer readable program code embodied therewith, the computer readable program code comprising:
computer readable program code configured to receive:
an inquiry from a user; and
a plurality of answer recipients, the answer recipients having requested receipt of an answer to the inquiry, wherein the plurality of answer recipients are assigned at least one predefined field of expertise;
computer readable program code configured to analyze the inquiry using a language processing system;
computer readable program code configured to generate at least one keyword associated with the inquiry based on analysis of the language processing system;
computer readable program code configured to receive a modification to the at least one generated keyword from the user;
computer readable program code configured to, in response to receiving the modification to the at least one generated keyword from the user, automatically improve the language processing system to learn from the modification to the at least one generated keyword from the user and improve accuracy for subsequent analyses;
computer readable program code configured to determine, using a processor, an inquiry recipient by:
reading from a memory a plurality of potential inquiry recipients, each of the plurality of potential inquiry recipients being assigned at least one predefined field of expertise; and
based on the at least one keyword, the at least one predefined field of expertise assigned to each of the plurality of potential inquiry recipients, and the at least one predefined field of expertise assigned to each of the plurality of answer recipients, suggesting that one of the potential inquiry recipients be the inquiry recipient;
computer readable program code configured to assign an inquiry recipient to answer the inquiry;
computer readable program code configured to transmit the inquiry to the inquiry recipient;
computer readable program code configured to receive the answer to the inquiry;
computer readable program code configured to transmit the answer to the inquiry to the plurality of answer recipients; and
computer readable program code configured to store the inquiry, the at least one keyword associated with the inquiry, and the answer to the inquiry in the memory.

* * * * *